(No Model.) 12 Sheets—Sheet 1.

G. F. EISENHARDT & T. J. FLYNN.
APPARATUS FOR MAKING INLAID OR MOSAIC LINOLEUM.

No. 557,785. Patented Apr. 7, 1896.

FIG. 1

WITNESSES:
William J. Fisher
Frank C. Rak

INVENTORS
George F. Eisenhardt & Thos. J. Flynn
BY
Charles N. Butler
ATTORNEY (No Model.) 12 Sheets—Sheet 4.

G. F. EISENHARDT & T. J. FLYNN.
APPARATUS FOR MAKING INLAID OR MOSAIC LINOLEUM.

No. 557,785. Patented Apr. 7, 1896.

FIG. 4.

WITNESSES: INVENTORS
William J. Fisher George F. Eisenhardt & Thomas J. Flynn
Frank C. Roak BY
Charles N. Butler
ATTORNEY (No Model.)  12 Sheets—Sheet 6.

G. F. EISENHARDT & T. J. FLYNN.
APPARATUS FOR MAKING INLAID OR MOSAIC LINOLEUM.

No. 557,785.  Patented Apr. 7, 1896.

WITNESSES:  INVENTORS
George F. Eisenhardt and Thomas J. Flynn
BY
Charles N. Butler
ATTORNEY

(No Model.) 12 Sheets—Sheet 7.

G. F. EISENHARDT & T. J. FLYNN.
APPARATUS FOR MAKING INLAID OR MOSAIC LINOLEUM.

No. 557,785. Patented Apr. 7, 1896.

(No Model.) 12 Sheets—Sheet 9.

G. F. EISENHARDT & T. J. FLYNN.
APPARATUS FOR MAKING INLAID OR MOSAIC LINOLEUM.

No. 557,785. Patented Apr. 7, 1896.

(No Model.) 12 Sheets—Sheet 11.

G. F. EISENHARDT & T. J. FLYNN.
APPARATUS FOR MAKING INLAID OR MOSAIC LINOLEUM.

No. 557,785. Patented Apr. 7, 1896.

WITNESSES:
William J. Fisher
Frank L. Roak

INVENTORS
George F. Eisenhardt
Thomas J. Flynn
BY
Charles N. Butler
ATTORNEY

ANDREW B.GRAHAM. PHOTO-LITHO. WASHINGTON, D.C.

(No Model.) 12 Sheets—Sheet 12.

G. F. EISENHARDT & T. J. FLYNN.
APPARATUS FOR MAKING INLAID OR MOSAIC LINOLEUM.

No. 557,785. Patented Apr. 7, 1896.

WITNESSES:

INVENTORS
George F. Eisenhardt and Thomas J. Flynn
BY
Charles N. Butler
ATTORNEY

UNITED STATES PATENT OFFICE.

GEORGE F. EISENHARDT AND THOMAS J. FLYNN, OF PHILADELPHIA, PENNSYLVANIA, ASSIGNORS TO THE THOMAS POTTER SONS & COMPANY, OF SAME PLACE.

APPARATUS FOR MAKING INLAID OR MOSAIC LINOLEUM.

SPECIFICATION forming part of Letters Patent No. 557,785, dated April 7, 1896.

Application filed October 2, 1895. Serial No. 564,389. (No model.)

*To all whom it may concern:*

Be it known that we, GEORGE F. EISENHARDT, a citizen of the United States, and THOMAS J. FLYNN, a citizen of Great Britain, residing in the city of Philadelphia, State of Pennsylvania, have invented a new and useful Improvement in Apparatus for Making Inlaid or Mosaic Linoleum, of which the following is a specification.

Our mode of operation consists in first fixing upon the burlap or cloth backing on which the design is built the tesseræ forming the foundation or outline of the design. These tesseræ are cut of the desired shape and are spaced upon the cloth by means of a templet. They are then fixed by pressure from plungers corresponding with the tesseræ in shape and registering exactly with the apertures of the templet in which the tesseræ are placed. The outline being thus fixed, providing a guide, the tesseræ forming the remaining figures of the design are placed in the interstices by hand, and the whole then consolidated by heavy pressure. A distinct advantage gained by this mode of operation is the accuracy or perfect symmetry of the figures of the finished product. The tesseræ join one another in clean straight lines, obviating the objectionable ragged and crooked joints frequently seen in inlaid linoleum. The consolidation of the material by heavy pressure firmly unites the tesseræ together and fixes the whole design permanently upon the burlap, securing a fabric that will not part or open.

The apparatus designed for effecting the operation is illustrated in the accompanying drawings, in which—

Figure 17:
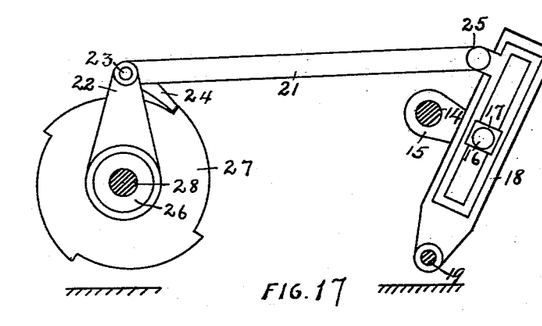
Fig. 17, a detail view on the line $o\,p$ of Fig. 3.
Figure 18:
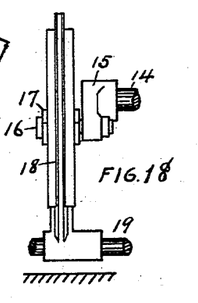
Fig. 18, an end view of the mechanism shown in Fig. 17.

The machine is driven by a belt passing around the pulley 1, the pulley being fixed on the shaft 2, which is journaled in bearings on the pedestals 3 and 4. Secured on the shaft 2 and revolving therewith is a gear-wheel 5 of small diameter, which drives a larger gear-wheel 6, fixed on the shaft 7. This shaft is journaled in suitable bearings on the pedestals 8 and 9, and has secured on its end a small gear-wheel 10, which drives a larger gear-wheel 11, fixed on the shaft 14. The shaft 14 is journaled in bearings on the pedestals 12 and 13 and has fixed on its end the crank 15, Figs. 3, 17, and 18. A pin 16, secured to the crank, passes through and is journaled in a block 17, which moves up and down the link 18 as the crank revolves, rocking the link and the shaft 19 upon which it is fixed, the shaft being journaled in bearings formed in the pedestals 13 and 20, Figs. 3, 17, and 18. The rapidly-moving pulley thus imparts a comparatively slow motion to the link.

Rods 21 have a pivotal connection 25 with the link 18, while their opposite ends are connected by a pintle 23 with rock-arms 22, loosely mounted on the hub 26 of a four-toothed ratchet-wheel 27, Figs. 3, 11, 12, 13, and 17. A pawl 24, fixed on the pintle 23, engages the notches of the ratchet-wheel, moving it forward a quarter of a revolution at each stroke, and as this wheel is secured on the shaft 28, which is journaled in bearings in the pedestals 220ᵃ and 221ᵃ, the shaft is given a corresponding intermittent motion.

It will be observed that in its revolution through a given arc in the lower part of its path the crank-pin 16 will effect a quicker movement of the link 18 than in moving through the same arc in the upper part of its path, hence securing a "quick return" in the action of the pawl.

Figure 1:
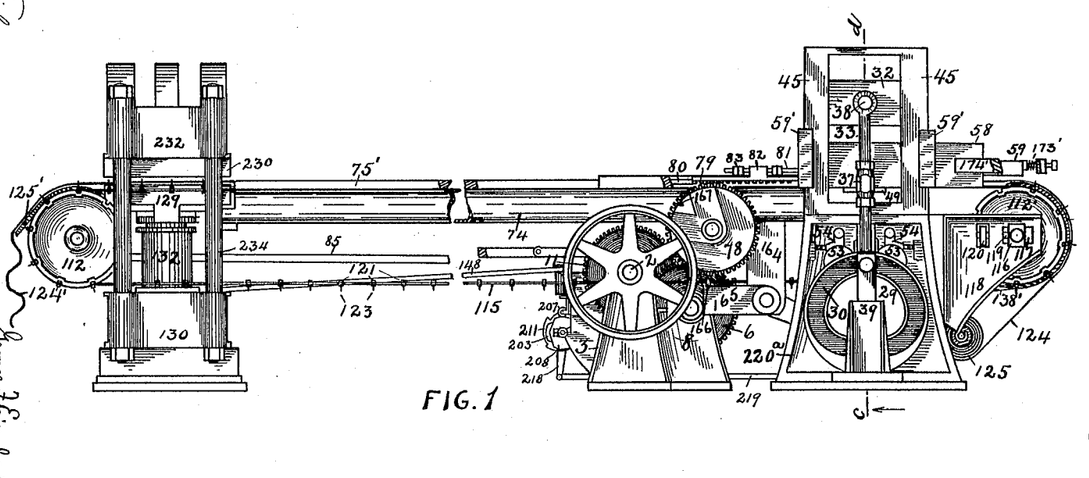
Figure 1 is a side elevation of the entire machine.
Figure 3:
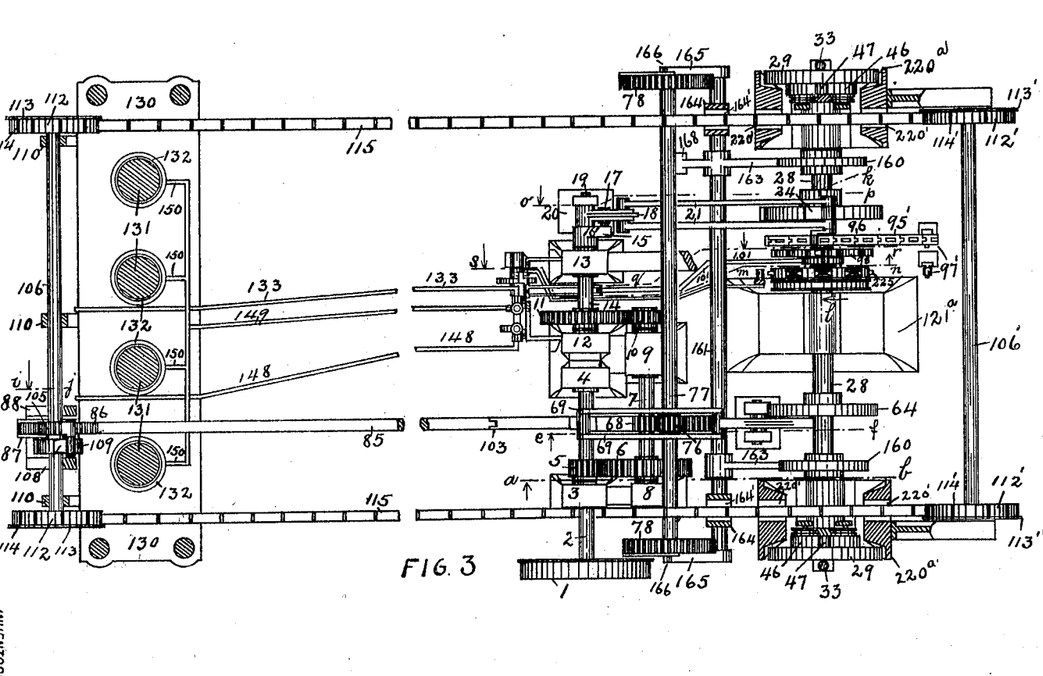
Fig. 3, a plan view with the top removed.
Figure 5:
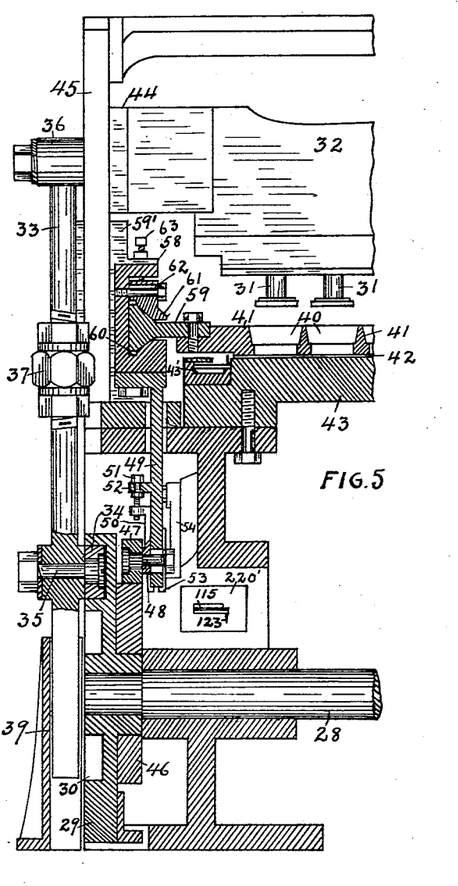
Fig. 5, a partial sectional view taken on the line $c\,d$ of Fig. 1.

Fixed on the ends of shaft 28 are two disks 29, having heart-cams 30, exactly similar, turned in their outer faces, Figs. 1, 3, and 5. Rollers 34, turning on spindles 35, ride in these cam-tracks, the spindles passing through shafts 33, to which they are suitably secured. The lower ends of the shafts 33 are free to move vertically only in the keepers 39, thus keeping the rollers 34 vertically over the axis of the cams. The upper ends of these shafts are provided with hubs 36, which are sleeved on spindles 38, attached to the plunger-block 32, which carries the plungers 31.

Turnbuckles 37 permit adjustment in the length of the shafts, which are made in two pieces.

The plunger-block is provided with ways 44, which guide it in vertical movement along the standards 45.

It will be observed that as the deepest point of the cam 30 (that nearest the axis of revolution) rises the block 32 will be brought down, and as the arrangement is such that the descending plungers exactly register with the apertures 40 of the templet 41 tesseræ that have been placed in these apertures will be driven down and fixed on the burlap, which lies in the narrow space 42 between the bedplate 43 and the templet. The next quarter-revolution of the cams 30 again elevates the plungers.

Figure 2:
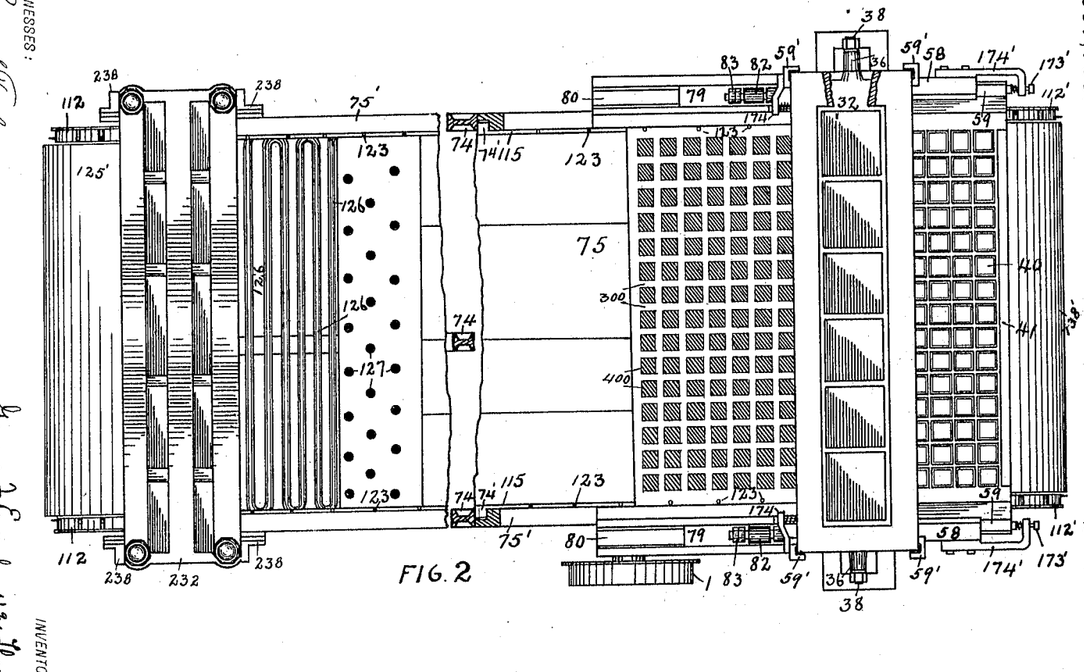
Fig. 2, a plan view of the entire machine.
Figure 4:
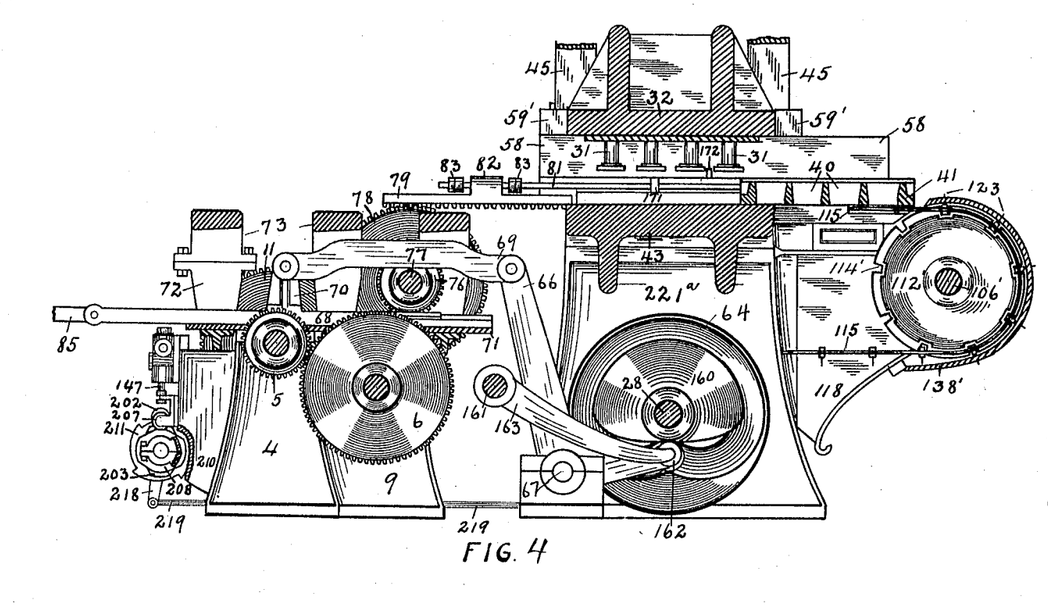
Fig. 4, a sectional view taken on the line $a\,b$ of Fig. 3.

As a section of the tesseræ forming the outline of the design has now been fixed on the burlap, the templet is next slightly elevated to prevent its interference with the work that has been done and then moved back to the position shown in Figs. 2 and 4, convenient for charging with the tesseræ to form the outline of the next section.

Figure 6:
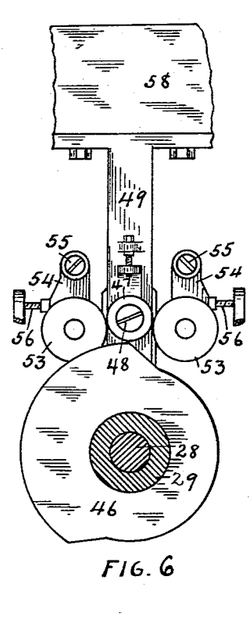
Fig. 6, a detail view of the mechanism for elevating the templet.
Figure 7:
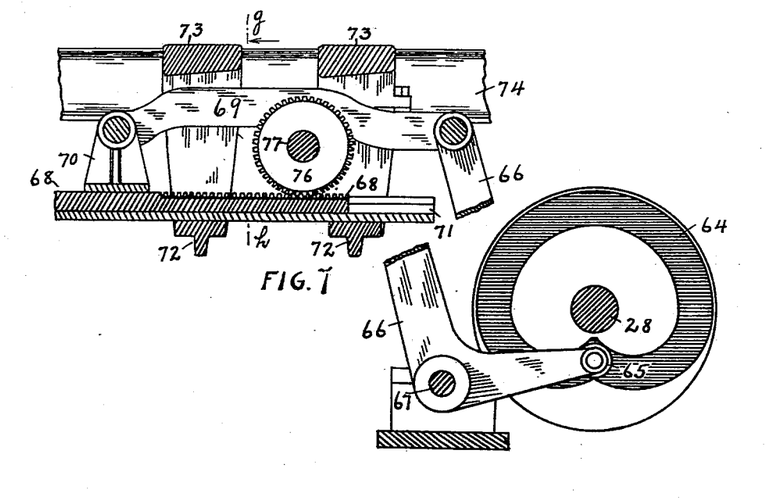
Fig. 7, a detail view on the line $e\,f$ of Fig. 3.
Figure 8:
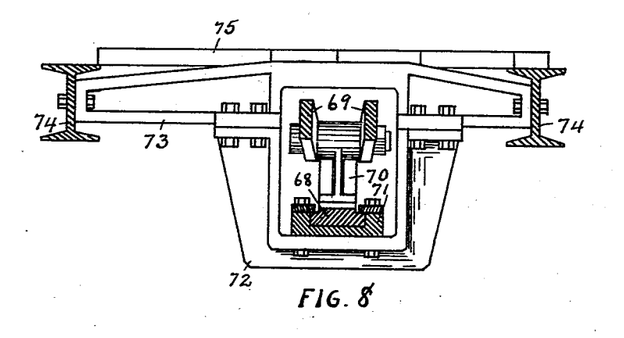
Fig. 8, a detail view on the line $g\,h$ of Fig. 7.

To elevate the templet, cams 46 are fixed on the hubs of the disks 29, the highest part of the periphery of each cam 46 corresponding in position with the highest point of each cam 30, the lowest points of the respective cams corresponding in like manner, Figs. 3, 5, and 6. A roller 47 rides on the periphery of each cam 46 and turns on a spindle 48, which is adjustably secured to a column 49 by means of the hanger 50, connected with a projection 52 of the column by means of the screw 51. To hold the lower end of the column from oscillating, guide-rollers 53, pivoted on the hangers 54, bear against its edges and are adjusted to the desired position by means of set-screws 56, suitably seated in the pedestals 220ᵃ. The hangers are free to rock on pivots 55, supported by the pedestal. The upper end of each column is bolted to a guide-beam 58, having keepers 59', which engage the frame-standards 45, along which they are free to slide, Figs. 1, 3, 5, and 6. The inner face of each guide-beam is provided with a horizontal channel to receive a guide-bar 59, of dovetail cross-section, which slides in a dovetail groove 60, formed by the channel and bar 61, Figs. 2, 5, 30, 31, and 32. The bar 61 is bolted to the guide-beam, the bolt-holes being sufficiently large to permit the vertical adjustment of the bar by means of the set-screws 63. As the templet 41 is bolted to the guide-bars, it will be slightly elevated by the cams 46 concurrently with the elevation of the plungers 31, while the dovetail channels 60 permit the movement of the templet backward.

To draw back the templet, a heart-cam 64 is fixed on the shaft 28. A roller 65, pivoted on the short arm of a bell-crank 66, which rocks on a shaft 67, journaled in suitable bearings, rides in the cam-track. The long arm of the bell-crank is connected by rods 69 with a pedestal 70, integral with the rack 68, which is free to slide in a channel 71. This channel is supported on hangers 72, secured to cross-beams 73, which are bolted between the I-beams 74, Figs. 3, 4, 7, and 8. The rack engages a gear-wheel 76, fixed on the shaft 77, which is journaled in suitable bearings supported by the I-beams. On the ends of this shaft gear-wheels 78 are secured. Racks 79, engaging with the gear-wheels 78 and free to move in the channels 80, supported on the I-beams, are connected with the templet 41 by the rods 81, Fig. 4. These rods pass through shoulders 82 on the racks, the relative positions of the racks and the templet being regulated by means of nuts 83. A bar 170 is bolted to the guide-bar 59 and is provided with an arm 171, which engages and supports the rod 81, and a shoulder 172, which in the forward movement of the templet strikes the buffer 173, secured to the guide-beam by the bracket 174. Brackets 174' on the rear ends of the guide-beams support buffers 173', which limit and cushion the backward movement of the templet, as do the buffers 173 its forward movement, Figs. 4, 31, and 32.

Cams 160, fixed on the shaft 28, engage rollers 162, carried by the rocker-arms 163, which are secured on the shaft 161, Figs. 3 and 4. This shaft is journaled in suitable bearings in the hangers 164, which are supported by the I-beams 74. On the ends of the shaft 161 arms 165 are fixed and are provided with dogs 166, designed to engage the notches 167 of the gears 78, Figs. 1 and 3. When the templet is in its forward position, the highest points of the cams 160 (those farthest from the axis of revolution) are in contact with the rollers 162, the arms 163 are depressed, and the dogs 166 are held by their arms 165 in locking engagement with the gears 78, thus holding the apertures 40 of the templet 41 in registration with the descending plungers, the nuts 83 on the rods 81 permitting the proper adjustment of the parts, as previously explained. As the plungers and the templet are caused to rise by their respective cams 30 and 46, the flat portions of the cams 160 engage their respective rollers 162, permitting the arms 163 to rise and the dogs 166 to disengage the gears 78, the rocking of the shaft 161 being insured by a weight-arm 168. The deep portion of the cam 64 now elevates the short arm of the bell-crank 66, and the templet is thrust back, by means of the intermediate mechanism previously explained, in position convenient for recharging.

Figure 9:
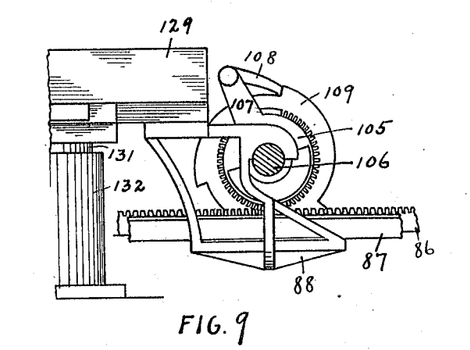
Fig. 9, a side view of a detail on the line $i\,j$ of Fig. 3.
Figure 10:
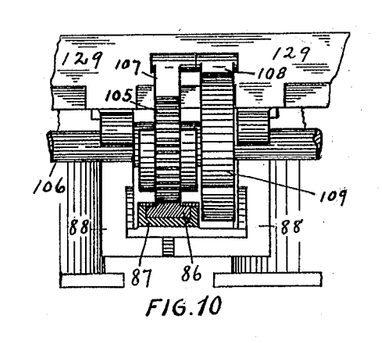
Fig. 10, a face view of the mechanism shown in Fig. 9.
Figure 11:
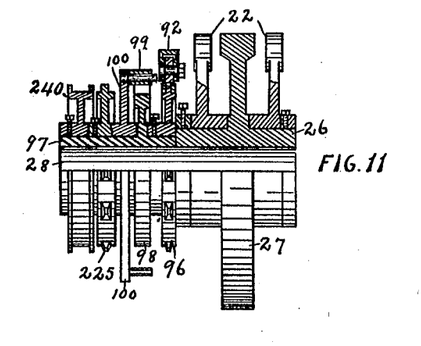
Fig. 11, a detail view, partially in section, on the line $k\,l$, Fig. 3.
Figure 12:
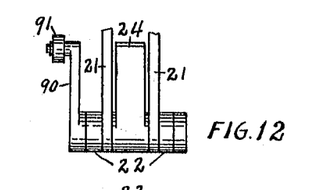
Fig. 12, the pawl which operates the large ratchet-wheel.
Figure 24:
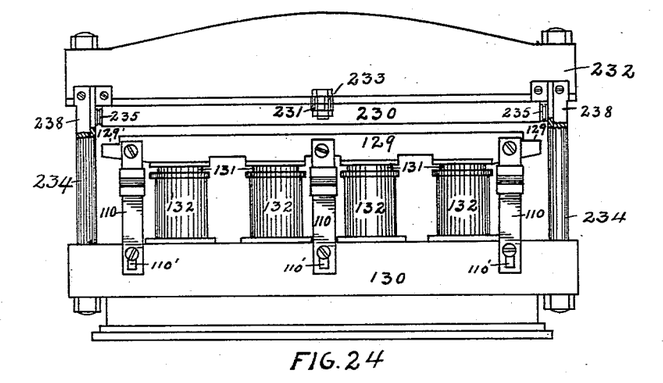
Fig. 24, a rear elevation of the press.

To move forward the section of the burlap on which the tesseræ have been fixed, and thus present a consecutive section to receive the new charge, the rack 68 is connected by a rod 85, hinged at 103, with a second rack 86, which is free to slide in a channel 87. This channel is supported by the bracket or shoe 88, which is carried by the press-platen 129. The backward movement of the rack 68, which induced the withdrawal of the templet, moves back the rack 86, which engages and turns a mutilated gear 105, loosely mounted on the shaft 106. An arm 107 on the mutilated gear carries a pivoted pawl 108, which by the action described is drawn back in position to reëngage a three-toothed ratchet-wheel 109, fixed on the shaft 106, Figs. 3, 9, and 10. This shaft is journaled in bearings in the brackets 110, bolted at their upper ends to the platen 129, the lower ends of these brackets being provided with slots 110', through which bolts are passed, holding them against the foundation-block 130, while permitting them vertical motion with the platen. Belt-wheels 112, having flanged faces 113 and axial grooves 114 at equal intervals on the peripheries, are fixed on the ends of the shaft 106. Belts 115 pass over these wheels through apertures 164' in the hangers 164, over belt-wheels 220' in the pedestals 220ª, over belt-wheels 112', Fig. 3, along suitable channels 43' in the bed-plate 43, Fig. 5, and ways 74', formed by the I-beams 74, and the bars 75', Fig. 2, and ways 129' in the platen 129, Fig. 24. The wheels 112', having flanged faces 113' and axial grooves 114' at equal intervals on their peripheries, are fixed on the ends of the shaft 106'. This shaft is journaled in bearings 116, made adjustable in the guideways 117, by means of the screw 119 and the wheel 120, all supported by the brackets 118 and serving to adjust the tension of the belts 115, Fig. 1. These belts have metal cleats 121 secured at intervals on their inner surfaces equal to the intervals between the axial grooves on the peripheries of the belt-wheels. The engagement of the grooves with these cleats prevents the belts from slipping.

Sharp-pointed pins 123 pass through the inner ends of the cleats 121 and through the belts, engaging the edges of the burlap 124, which is drawn from a roll 125, supported in suitable bearings in the brackets 118, and passes over a drum 138' and through the aperture 42 above the bed-plate 43. During the various steps in the operation the fabric is carried by these belts over the table 75 and the press-platen 129, the finished product 124' being delivered by the drum 125'. As the intermittently-rotating shaft 28 advances the cam 64, and in conjunction therewith the several cams described, the roller 65 will again be depressed, and consequently the rack 68, and with it the rack 86, will be again drawn forward, thus operating the pawl and ratchet 108 and 109, which move forward the belts and advance the burlap. The section that has been fixed in outline is thus drawn from under the plungers and the next consecutive section of the cloth is presented to receive the new charge of tesseræ. The forward movement of the rack 68 also returns the charged templet, the dog 166 rises and engages the wheel 78, locking the templet in position, the plungers descend, and a second section is fixed in outline.

As the fabric is carried along the table 75 the interstices 300 are filled in by hand, the foundation-figure 400 forming an accurate guide for the operation, Fig. 2. The design shown is selected merely for convenience of illustration, it being understood that any figure may readily be adopted.

Figures 13, 14, 15, 16:
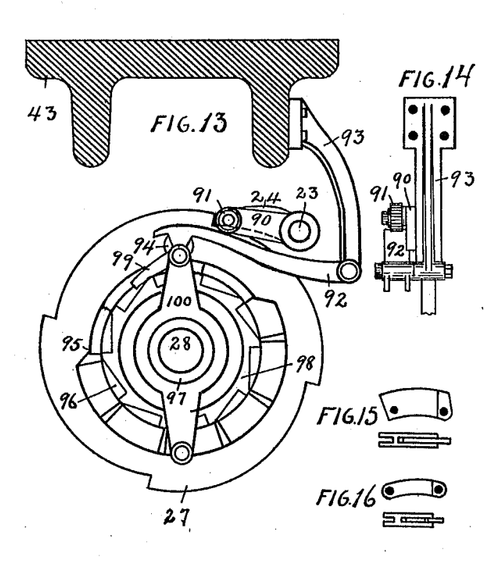
Fig. 13, an end view of the mechanism shown in Figs. 11 and 12 with means for disengaging the pawl, taken on the line $m\,n$ of Fig. 3.
Figs. 14, 15, and 16, details of the mechanism shown in Fig. 13.
Figure 19:
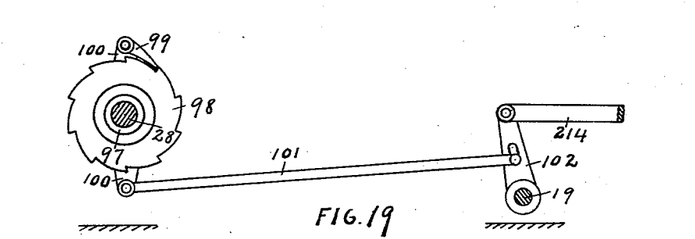
Fig. 19, a detail view on the line $q\,r$ of Fig. 3.

It is desirable to be able to regulate at will the interval between the successive operations of the templet and plunger to afford sufficient time for recharging the templet. This is done by throwing the pawl 24 out of engagement with the four-toothed ratchet-wheel 27, thus permitting the shaft 28 to remain stationary while the pawl is disengaged. To effect this, a crank 90, carrying a roller 91, is fixed on the pintle to which the pawl is secured. The roller rides back and forth on an arm 92, having its rear end pivoted to the bracket 93, secured to the bed-plate 43, while its forward end is provided with a roller 94, which rides on a sprocket-chain 95 or 95'. The sprocket-chain is operated by the sprocket-wheel 96, fixed on the hub 97 of the ten-toothed ratchet-wheel 98, which is loosely mounted on the shaft 28, Figs. 3, 11, and 13. The sprocket-chain 95 may be concentric with the sprocket-wheel, as shown in Fig. 13, or it may pass over a pulley 97' and the sprocket-wheel by which it is driven, as in the case of the chain 95'. (Shown in Fig. 3.) The chain is made up of a number of high links, as shown in Fig. 15, arranged consecutively, and a number of low links, as shown in Fig. 16, the proportionate number of each depending upon the length of time it is desirable to keep the parts stationary. This chain is in effect a variable cam, and the arm 92 will be elevated, elevating the crank 90 and the pawl 24 during the interval required for the high links to pass under the roller 94. The ratchet-wheel 98 is operated by a pawl 99, pivoted on the upper arm of a rock-lever 100, which turns freely on the hub 97. The lower arm of the rock-lever is connected by a rod 101 with a rock-arm 102, fixed on the shaft 19 and moving in unison with the link or rock arm 18, thus keeping the sprocket-wheel 96 in constant motion, Fig. 19.

The end of the table 75 near the press is covered with metal, having perforations 127 to permit the free communication of heat from the steam-pipes 126 (supported on the I-beams 74) to the fabric, in order to increase the adhesive quality of the tesseræ.

Figure 25:
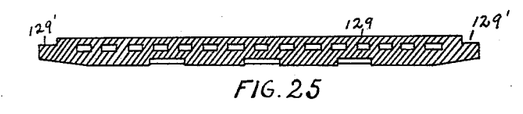
Fig. 25, a longitudinal vertical section of the press-platen.
Figure 26:
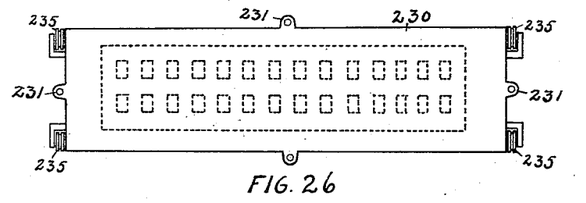
Fig. 26, a plan view of the press bed-plate.
Figure 27:
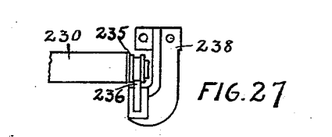
Figs. 27 and 28, details showing mechanism for removing the bed-plate.
Figure 28:
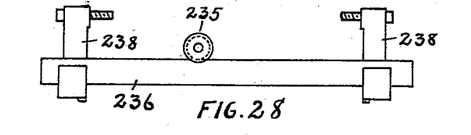
Figure 29:
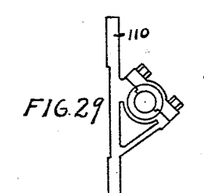
Fig. 29, a side view of a hanger.
Figure 30:
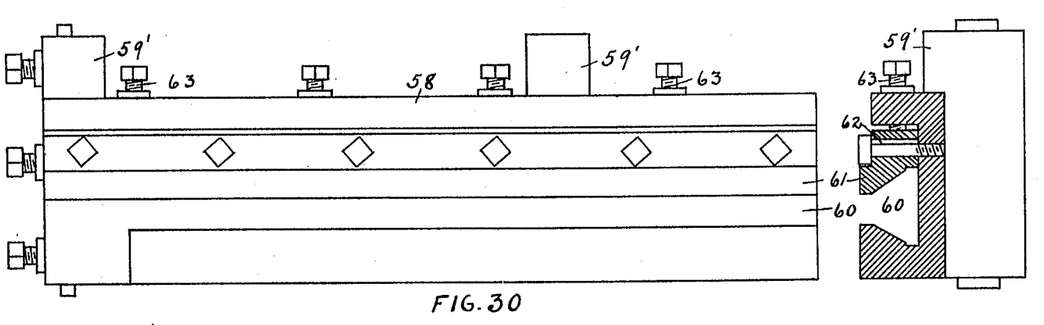
Figs. 30, 31, and 32, details of the mechanism for moving the templet.
Figure 31:
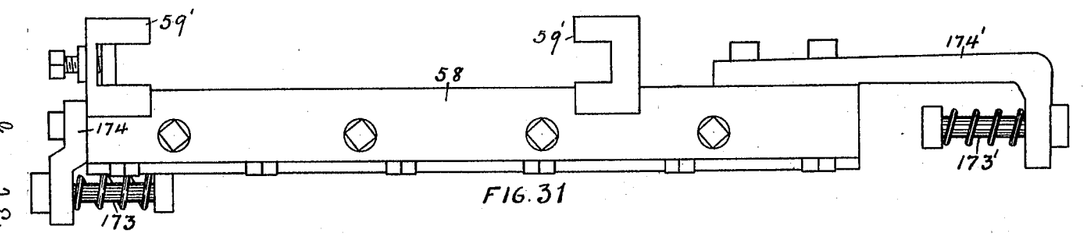
Figure 32:
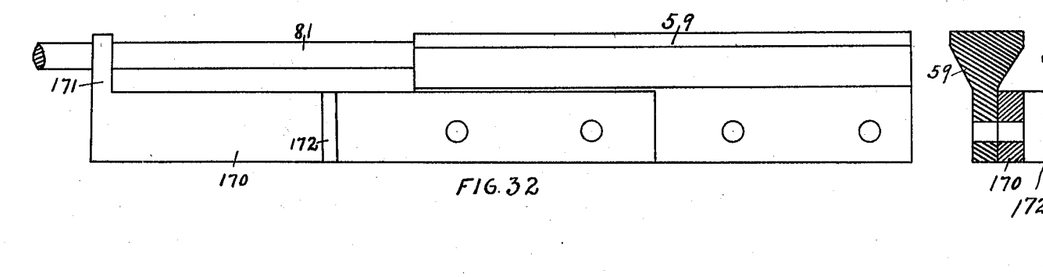

The press-platen 129, as shown in cross-section in Fig. 25, and the press bed-plate 230, as shown in the dotted lines in Fig. 26, are cored out in order that they may be heated and thus increase the viscosity of the tesseræ upon which they act.

Each section of the fabric as it reaches the platen 129 is forced against the bed-plate by the hydrostatic press, which is automatic in action. The platen is supported on four pistons 131, which move in cylinders 132. These pistons are operated by fluid forced by a condenser through the pipe 133, port 134, and (when the valve 135 is elevated, uncovering its port 135', and the oppositely-moving valve 143 lowered, covering its port 143') through the port 135', port 141, pipe 149, and distribution-pipes 150 to the cylinders, Figs. 3, 21, 22, and 23.

Figure 20:
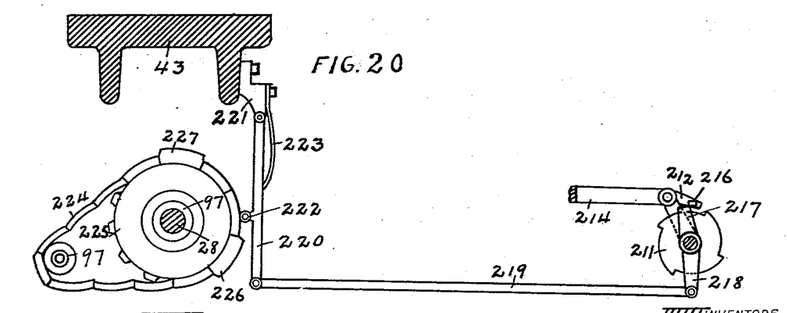
Fig. 20, a detail view on the line $s\,m\,n$ of Fig. 3.
Figures 21, 22, 23:
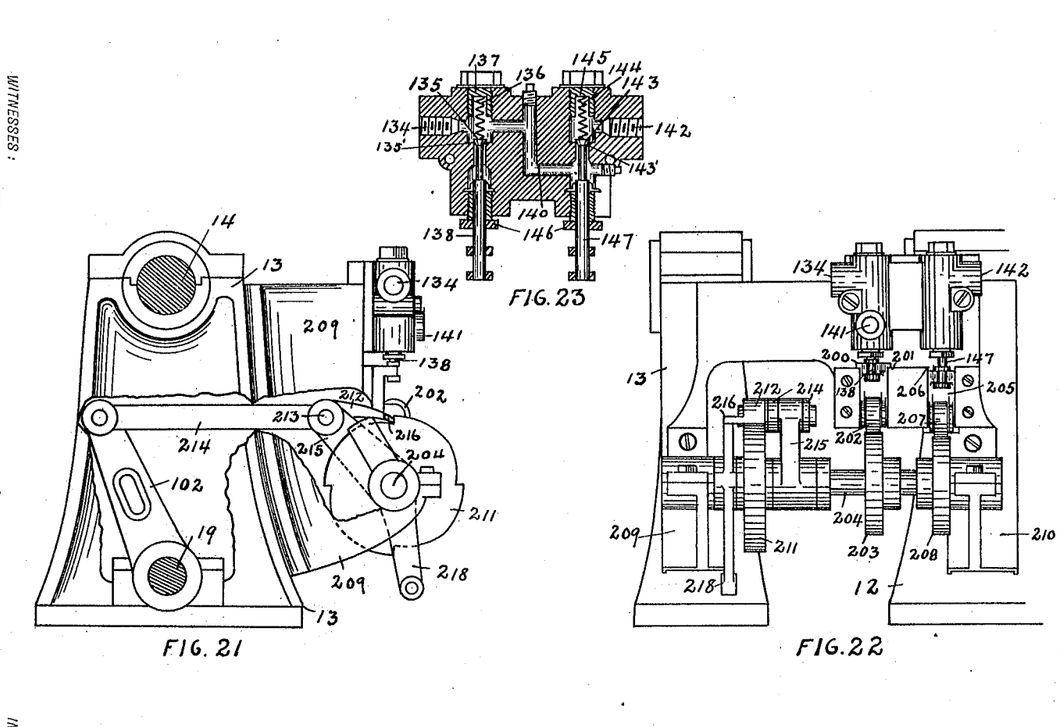
Fig. 21, a side view of the valve mechanism.
Fig. 22, a face view of the valve mechanism.
Fig. 23, a sectional view showing the valves.

The valves 135 and 143 are respectively carried by the valve-stems 138 and 147, which play in gaskets 146. These valves are held on their respective seats by the coiled spring 136, seated in a recessed nut 137, and the coiled spring 144, seated in the recessed nut 145. A block 200, sliding in suitable ways 201, has its upper end connected with the valve-stem 138, while its lower end carries a roller 202, which rides on the periphery of an oval or elliptical cam 203, fixed on the shaft 204, Figs. 4, 21, 22, and 23. A second block 205, sliding in ways 206, has its upper end connected with the valve-stem 147, while its lower end carries a roller 207, which rides on the periphery of an oval or elliptical cam 208, fixed on the shaft 204, the major axis of the cam 208 being at right angles to the major axis of the cam 203, as shown in Fig. 4. The shaft 204 is journaled in bearings 209 and 210, supported by the pedestals 12 and 13, and is operated by a ratchet-wheel 211 fixed on it. The ratchet-wheel is driven by a pawl 212, carried by a pintle 213, which connects the rods 214 and the rock-arm 215, loosely mounted on the shaft 204. The rods 214 are connected with the rock-arm 102, fixed on the shaft 19, which is constantly rocked by the link 18. This arrangement of parts would keep the cams 203 and 208 in constant motion and the corresponding valves 135 and 143 in constant alternating or reciprocating action, one being seated when the other is elevated. As, however, it is desirable to regulate the time between the successive actions of the press, which actions take place when the valve 135 is elevated, it is necessary to regulate the action of these valves. To effect this, the pawl 212 is provided with a projection 216, which projects in the path of the arm 217 of a rock-lever 218, loosely mounted on the shaft 204. The lower arm of the lever 218 is pivoted to a rod 219, which has its opposite end pivoted to a pendulating bar 220, which is pivoted to a bracket 221. The bracket is bolted to the bed-plate 43, Fig. 20. This bar 220 is provided with a roller 222, which is held against the sprocket-chain 224 by a spring 223. The sprocket-chain passes around a sprocket-wheel 225, fixed on the hub 97 of the constantly-moving ratchet-wheel 98, and over a fixed pulley 97'. The chain is made of the desired length of high and low links of the character previously described. In this instance, however, the links arranged are in two groups, there being but two high links 226 and 227, separated by two low links.

While the roller 222 bears against the low links of the advancing sprocket-chain, the arm 217 of the rack-lever 218 will be held forward in engagement with the projection 216 on the pawl 212, lifting the pawl out of engagement with the ratchet-wheel 211. As the sprocket-chain advances and the high link 226 engages the roller 222 the bar 220 will be rocked, moving back the arm 217 and permitting the pawl to engage the ratchet-wheel, driving it forward a quarter of a revolution. The forward movement of the ratchet-wheel moves the cams 203 and 208 into the position shown in Fig. 4. As a higher point of the cam 203 now engages the roller 202, the valve 135 is lifted off its seat against the resistance of the spring 136. At the same instant a low point of the cam 208 comes into engagement with the roller 207, permitting the spring 144 to seat the valve 143, which was previously held elevated to relieve pressure from the condenser through the passage 140, ports 143' and 142, and escape-pipe 148. The valve 135 being elevated, fluid from the condenser is forced through the pipe 133, ports 134 and 135, through the port 141 and pipes 149 and 150 to the cylinders. The platen 129 is thus driven up against the bed-plate 230 with great force, driving the tesseræ (which have been rendered adhesive and somewhat viscous by the heated pipes, platen, and bed-plate) down on the cloth, fixing them securely and closing up all joints. Since the pawl 212 has time to strike but a single stroke while the link 226 is passing the roller 222, the pawl will be again elevated and remain elevated until the high link 227 strikes the roller 222. It will follow that during this interval the valve 135 will remain elevated and the pressure from the condenser will continue to keep the press-platen 129 forced up against the bed-plate 230, while the valve 143 will remain down, cutting off the escape through port 142.

When the high link 227 strikes the roller 222 and rocks the arm 220, permitting the pawl 212 to again engage the ratchet-wheel, this wheel will again be forced forward a quarter of a revolution. Here it will stop, for the high link 227 will pass the roller 222 and the pawl 212 be again elevated before the rod 214 can strike the successive stroke. The valve 143 is thus elevated by the cam 208 and the escape through the ports 143' and 142 opened, while the spring 137 is permitted to seat the valve 135, thus cutting off the pressure to the press and permitting the platen 129 to fall, where it remains until the advancing chain 224 again causes the operation to be repeated.

In order to prevent any tendency the hub 97 of the ratchet-wheel 98 may have to move with the intermittently-rotating shaft 28, upon which it is loosely sleeved, a brake-wheel 240, which may be controlled by any ordinary frictional device, is secured upon the hub 97.

In order to readily remove the press bed-plate 230, it is provided with lugs 231, by means of which it is bolted to the cross-beam 232, provided with similar lugs 233. The cross-beam is held securely in place by four posts 234, secured to the foundation-block 130. Two grooved wheels 235 are journaled at each end of the bed-plate and are adapted to run on rails 236, supported by the hangers 238, which are secured to the cross-beams 232. When the press is in operation, these rails are removed, and when it is desired to remove the bed-plate they are slipped in place, forming a track for the wheels 235.

It will be understood from the foregoing description that the action of the machine is entirely automatic. The constantly-rotating pulley 1 drives the crank 15 and the link 18, from which all the parts are operated. The oscillating link communicates an intermittent forward movement to the shaft 28 through the pawl 24 and the ratchet-wheel 27.

The intermittently-rotating shaft 28 drives the cam 64, which rocks the bell-crank 66 and reciprocates the rod 85. The rack 86 on the end of this rod rocks the mutilated gear 105, thus driving forward the ratchet-wheel 109, shaft 106, belt-wheels 112 and 112', and carrier-belt 115. The burlap is thus carried forward intermittently, consecutive sections being presented to receive the tesserae that have been placed in the templet to be fixed in place by the plungers. The reciprocations of the rod 85 reciprocate the templet 41 horizontally through the intermediate mechanism—viz., the rack 68, gears 76 and 78, and their shaft 77, and racks 79, connected with the templet, the templet moving forward in unison with the burlap. The intermittently-rotating shaft 28 reciprocates the plungers through the cams 30 and the shafts 33, while the vertical reciprocation of the templet in unison therewith is effected by the cams 46 and the columns 49. These cams are so arranged on the shaft that the vertical reciprocations of the plungers and templet are in alternation with the forward movement of the burlap and the horizontal reciprocations of the templet, as is essential to the operation.

The interval between the successive operations of this part of the machine is made variable at will by the variable cam or sprocket chain 95 or 95', which, by the mere insertion or withdrawal of high links, varies the period the pawl 24 is held out of engagement with the ratchet-wheel 27 through the crank 90 and the rock-arm 92. The oscillating link 18 oscillates the shaft 19, on which it is fixed, and therethrough the rock-arm 102. The oscillation of this arm drives constantly forward the ratchet-wheel 98 and the sprocket-wheels 96 and 228 fixed thereon through the rod 101, rock-lever 100, and pawl 99.

The variable chain 224, driven by the sprocket-wheel 225, controls the rock-lever 218, which disengages the pawl 212 from engagement with the ratchet-wheel 211 during intervals variable at will, the pawl being kept constantly in motion by the rod 214, connecting it with the rock-arm 102. This intermittently-rotating ratchet-wheel drives the cams 203 and 208, reciprocating the valves 135 and 143 alternately, and thereby operating the press at will.

It will appear to those skilled in the art that minor changes may be made without departing from the spirit of our invention, and we wish to be understood as not limiting ourselves to the specific constructions shown and described, but reserve the right to make such alterations and changes in the nature of equivalents as may be found expedient.

We claim as our invention—

1. In a machine for making inlaid linoleum, a horizontally-reciprocating templet, and mechanism which automatically effects the forward movement of the templet and the forward movement of the burlap in unison, substantially as shown and described.

2. In a machine for making inlaid linoleum, a horizontally-reciprocating templet, and mechanism which automatically effects the backward movement of the templet in alternation with the forward movement of the burlap, substantially as shown and described.

3. In a machine for making inlaid linoleum, a series of intermittently-acting plungers in combination with automatic mechanism for varying at will the interval between the successive actions of the plungers, substantially as shown and described.

4. In a machine for making inlaid linoleum, a reciprocating templet in combination with automatic mechanism for varying at will the interval between the successive reciprocations of the templet, substantially as shown and described.

5. In a machine for making inlaid linoleum, an intermittently-reciprocating templet, and a series of intermittently-reciprocating plungers, in combination with automatic mechanism for varying at will the interval between the respective reciprocations, substantially as shown and described.

6. In a machine for making inlaid linoleum, automatic mechanism for causing the intermittent forward movement of the fabric, having in combination means for varying at will the interval between the successive movements, substantially as shown and described.

7. In a machine for making inlaid linoleum, an intermittently-acting press in combination with mechanism for effecting the intermittent forward movement of the fabric, and mechanism for varying at will the intervals of the respective actions substantially as shown and described.

8. In a machine for making inlaid linoleum in combination, a series of plungers, an intermittently-rotating shaft, a cam fixed on the said shaft, a shaft which connects the plungers with the cam, and means for varying at will the interval of the intermittently-rotating shaft, substantially as shown and described.

9. A mechanical movement comprising a journaled shaft, a ratchet-wheel fixed thereon, a reciprocating pawl which engages the ratchet-wheel, and a variable cam or its equivalent having its surface connected with the pawl, substantially as shown and described.

10. A mechanical movement comprising a journaled shaft, a ratchet-wheel fixed thereon, a reciprocating pawl which engages the ratchet-wheel and rotates the shaft intermittently, a crank secured to the pawl, and a cam having its surface connected with the crank, substantially as shown and described.

11. In combination, a reciprocating pawl, a crank secured thereto, a cam, and a rock-arm having one end pivoted on a fixed support while the opposite end rides on the cam, the said crank being adapted to ride on the rock-arm, substantially as shown and described.

12. In combination, a reciprocating pawl, a crank secured thereto, a sprocket-wheel, a sprocket-chain having links of variable height, and a rock-arm having one end pivoted on a fixed support while the opposite end rides on the sprocket-chain, substantially as shown and described.

13. In combination a crank, an oscillating link, a journaled shaft and a ratchet-wheel fixed thereon, a rocker-arm, a connection between the link and the rocker-arm, a pawl, and means for disengaging the pawl during a given interval, substantially as shown and described.

14. In a machine for making inlaid linoleum, in combination, a templet adapted to reciprocate horizontally, a rotating cam, a bell-crank operated by the cam, and gearing connecting the templet and the bell-crank, substantially as shown and described.

15. In a machine for making inlaid linoleum, a templet adapted to reciprocate horizontally, a rack connected with the templet an intermittently-oscillating shaft, and a gear-wheel engaging the rack and fixed on the said shaft, substantially as shown and described.

16. In a machine for making inlaid linoleum, a templet adapted to reciprocate horizontally, a rack connected with the templet, a gear-wheel engaging the rack and fixed on a shaft which oscillates intermittently, and means for varying the relative positions of the rack and templet substantially as shown and described.

17. In a machine for making inlaid linoleum, a templet adapted to reciprocate horizontally, a rack connected with the templet, an oscillating shaft and a gear-wheel fixed thereon and engaging the rack, a cam fixed on a rotating shaft, and mechanism connecting the cam and oscillating shaft whereby the latter is driven from the former, substantially as shown and described.

18. In a machine for making inlaid linoleum, in combination, a cam, a bell-crank operated thereby, a rack connected to the bell-crank, and a gear-wheel operated by the rack, substantially as shown and described.

19. An intermittently-rotating cam, a bell-crank operated thereby, a rack connected to the bell-crank, a gear-wheel operated by the rack, in combination with mechanism for regulating at will the interval between the successive movements of the cam, substantially as shown and described.

20. A horizontally-reciprocating templet, a rack connected with the templet, a gear-wheel engaging the rack and fixed on a shaft which oscillates intermittently, in combination with an automatic dog which engages the gear-wheel and locks the templet in a given position, substantiatly as shown and described.

21. A rotating cam, an oscillating shaft, a rocker-arm fixed on the oscillating shaft and operated by the cam, a second arm fixed on the oscillating shaft and provided with a dog, in combination with an oscillating gear-wheel adapted to be engaged and locked by the dog, substantially as shown and described.

22. In a machine for making inlaid linoleum, a journaled shaft, a belt-wheel fixed thereon, a ratchet-wheel fixed on the shaft, a gear-wheel loosely mounted on the shaft, a pawl carried by the gear-wheel and adapted to engage the ratchet-wheel and an oscillating rack which engages and operates the gear-wheel, substantially as shown and described.

23. A journaled shaft, a ratchet-wheel fixed on the shaft, a gear-wheel loosely mounted on the shaft, a pawl carried by the gear-wheel and adapted to engage the ratchet-wheel, an oscillating rack which engages and operates the gear-wheel, and means for varying at will the interval, between the successive oscillations of the rack, substantially as shown and described.

24. In a machine for making inlaid linoleum, a belt to carry the burlap, a belt-wheel, a journaled shaft on which the belt-wheel is fixed, a ratchet-wheel fixed on the shaft, a gear-wheel loosely mounted on the shaft, a pawl carried by the gear-wheel and adapted to engage the ratchet-wheel, and an oscillating rack which engages and operates the gear-wheel, substantially as shown and described.

25. In a machine for making inlaid linoleum, in combination with a hydraulic press, an automatic valve which controls the pressure of the fluid that operates the press, an alternately-acting escape-valve, and means for varying at will the interval between the successive actions of the valves, substantially as shown and described.

26. In combination, an intermittently-rotating shaft, a pair of cams fixed thereon and a pair of reciprocating valves, and mechanism for effecting the intermittent rotation of the said shaft, substantially as shown and described.

27. In combination, an intermittently-rotating shaft, a pair of cams fixed thereon, a pair of reciprocating valves, and means for regulating at will the interval of the intermittently-rotating shaft, substantially as shown and described.

28. In a valve mechanism, an inlet-port and a distribution-port in communication, a valve controlling the communication between the inlet-port and the distribution-port, in combination with an escape-port having independent communication with the inlet-port and a valve controlling the communication between the escape-port and the inlet-port, substantially as shown and described.

29. A journaled shaft, a rocker-arm loosely mounted thereon, a pawl operated by the said rocker-arm, a ratchet-wheel fixed on the shaft, and a rock-lever loosely mounted on the shaft and adapted to elevate the pawl, substantially as shown and described.

30. A journaled shaft, a rocker-arm loosely mounted thereon, a pawl operated by the said rocker-arm, a ratchet-wheel fixed on the shaft, a rock-lever loosely mounted on the shaft and having one arm adapted to engage and elevate the pawl, in combination with mechanism for actuating the rock-lever, substantially as shown and described.

31. An oscillating shaft, a rocker-arm fixed thereon, a rock-lever and a pawl connected with the rocker-arm, in combination with a ratchet-wheel and a cam fixed on the ratchet-wheel substantially as shown and described.

32. An oscillating shaft, a rocker-arm fixed thereon, a rock-lever and a pawl connected with the rocker-arm, in combination with a ratchet-wheel and a variable cam which is driven by the ratchet-wheel substantially as shown and described.

33. An oscillating shaft, a rocker-arm fixed thereon, a rock-lever and pawl connected with the rocker-arm, in combination with a ratchet-wheel and a sprocket-wheel driven by the ratchet-wheel, substantially as shown and described.

34. A pawl and ratchet, in combination with a sprocket-wheel and a sprocket-chain with links of variable height, substantially as shown and described.

35. A sprocket-wheel, a sprocket-chain having links of variable height, a pendulating arm in engagement with the sprocket-chain, in combination with an engaging pawl and ratchet and a rock-lever adapted to disengage the pawl and ratchet substantially as shown and described.

36. In a machine for making inlaid linoleum, in combination, a horizontally-reciprocating templet connected with and operated by an intermittently-rotating shaft, a series of vertically-reciprocating plungers connected with and operated by the said shaft, and mechanism for effecting the intermittent forward movement of the burlap, substantially as shown and described.

37. In a machine for making inlaid linoleum, in combination, a horizontally and vertically reciprocating templet connected with and operated by an intermittently-rotating shaft, and a series of vertically-reciprocating plungers connected with and operated by the said shaft, substantially as shown and described.

38. In a machine for making inlaid linoleum, in combination, a rotating shaft, a templet, a cam fixed on the said shaft and connected with the templet, a series of plungers, and a cam fixed on the said shaft and connected with the plungers, substantially as shown and described.

39. In a machine for making inlaid linoleum, in combination, a rotating shaft, a series of plungers, a cam operated by the said shaft and connected with the plungers, a horizontally and vertically reciprocating templet, a cam operated by the said shaft and connected with the templet for effecting the horizontal reciprocation thereof, and a second cam operated by the said shaft and connected with the templet for effecting the vertical reciprocation thereof, substantially as shown and described.

40. In a machine for making inlaid linoleum, in combination, a journaled shaft, a cam fixed thereon, a rack connected with the cam and adapted to be operated thereby, a templet and a rack connected therewith, and gearing connecting the two racks, substantially as shown and described.

41. In a machine for making inlaid linoleum, a templet, a rack connected therewith, a cam, a rack connected with the said cam and operated thereby, gearing connecting the two racks, and means for locking the said mechanism, substantially as shown and described.

42. In a machine for making inlaid linoleum, a templet, a rack connected therewith, a cam, a rack connected with the said cam and operated thereby, gearing connecting the two racks, and an automatic dog adapted to engage the gearing and lock the mechanism, substantially as shown and described.

43. In a machine for making inlaid linoleum, a templet, a rack connected therewith, a cam, a rack connected with the said cam and operated thereby, gearing connecting the two racks, a dog and a cam connected therewith for automatically locking the said mechanism, substantially as shown and described.

44. In a machine for making inlaid linoleum, in combination, an intermittently-rotating shaft, a cam fixed thereon, a rack, mechanism connecting the said cam and the rack, a templet and a rack connected therewith, gearing connecting the two racks, a dog adapted to engage and lock the gearing, a second cam fixed on the said shaft, and mechanism connecting the second cam and the dog, substantially as shown and described.

45. In a machine for making inlaid linoleum, in combination, a templet, a rack connected therewith, a rod having a rack on each end thereof, gearing connecting the rack on one end of the rod with the rack connected with the templet, gearing operated by the rack on the opposite end of the rod and cloth-carrying mechanism operated thereby, substantially as shown and described.

46. In a machine for making inlaid linoleum, an automatic press and means for varying at will the interval between the successive actions of the said press, in combination with an automatic cloth-carrying mechanism and means for varying at will the interval between the successive actions of the said cloth-carrying mechanism, substantially as shown and described.

47. In a machine for making inlaid linoleum, a hydraulic press, a valve which controls the actions of the press, an oscillating link connected with and operating the said valve, a rotating shaft connected with and operated by the said link, and cloth-carrying mechanism connected with and operated by the said rotating shaft, whereby the correlative action of the said press and the said cloth-carrying mechanism is effected, substantially as shown and described.

48. In a machine for making inlaid linoleum, a hydraulic press, a valve which controls the actions of the press, an oscillating link connected with and operating the said valve, a rotating shaft connected with and operated by the said link, and a reciprocating templet connected with and operated by the said rotating shaft, substantially as shown and described.

49. In a machine for making inlaid linoleum, a hydraulic press, a valve which controls the actions of the press, an oscillating link connected with and operating the said valve, a rotating shaft connected with and operating the said link, and a series of reciprocating plungers connected with and operated by the said rotating shaft, substantially as shown and described.

50. In a machine for making inlaid linoleum, in combination, a cloth-carrier, a templet, a series of plungers, a press, and mechanism interdependent of the said parts which effects the automatic and correlative action of the said parts, substantially as shown and described.

51. In a machine for making inlaid linoleum, in combination, a cloth-carrier, a templet, a series of plungers, a press, mechanism which effects the automatic and correlative action of the said parts, and mechanism for varying the interval of the successive actions, substantially as shown and described.

GEORGE F. EISENHARDT.
THOMAS J. FLYNN.

Witnesses:
HERRMAN DIENELT,
WM. F. SIEGENER.